United States Patent [19]

Coyne

[11] 4,143,106

[45] Mar. 6, 1979

[54] CONTINUOUS FLOOD FOAMING OF THERMOPLASTIC RESIN

[75] Inventor: Brenton S. Coyne, Midland, Mich.

[73] Assignee: The Dow Chemical Company, Midland, Mich.

[21] Appl. No.: 824,882

[22] Filed: Aug. 15, 1977

[51] Int. Cl.² ............................................. B29D 27/00
[52] U.S. Cl. ...................... 264/51; 264/236; 264/347; 264/DIG. 18; 432/8
[58] Field of Search ................ 264/54, DIG. 18, 234, 264/235, 236, 345, 346, 347; 432/8

[56] References Cited

U.S. PATENT DOCUMENTS

| | | | |
|---|---|---|---|
| 2,971,221 | 2/1961 | Schoenbeck | 264/347 |
| 3,024,492 | 3/1962 | Antolino | 264/347 X |
| 3,051,992 | 9/1962 | Bradley | 264/347 X |
| 3,382,303 | 5/1968 | Stieg | 264/49 |
| 3,394,045 | 7/1968 | Gould | 264/235 X |
| 3,562,367 | 2/1971 | Shinohara et al. | 264/234 X |
| 3,600,336 | 8/1971 | Okada et al. | 264/DIG. 18 |
| 3,812,225 | 5/1974 | Hosoda et al. | 264/236 X |
| 3,859,247 | 1/1975 | MacKenzie | 264/236 X |
| 4,029,450 | 6/1977 | Caser | 264/347 X |

*Primary Examiner*—Philip Anderson
*Attorney, Agent, or Firm*—Lester J. Dankert; Thomas R. Wills

[57] ABSTRACT

A continuous method for foaming foamable thermoplastic resin by floating the resin upon a heated liquid bath while heating it from above by flooding the upper surface of the floating resin material with a blanket of a liquid at substantially the same temperature as the heated bath. In an example, the flooding liquid is pumped from the heated bath and sprayed over the upper surface of the floating resin material.

9 Claims, 2 Drawing Figures

CONTINUOUS FLOOD FOAMING OF THERMOPLASTIC RESIN

BACKGROUND OF THE INVENTION

It is known to produce thermoplastic resin in sheet form by compounding such a resin, e.g., polyethylene, with a thermally-decomposing blowing agent such as azodicarbonamide, heat-plastifying the composition under conditions not causing decomposition of the blowing agent, fabricating therefrom a noncellular sheet, cross-linking the sheet if necessary to impart a certain degree of form retentiveness during heating, e.g., by which high energy electron radiation, and heating the sheet to effect decomposition of the blowing agent and formation of gas-filled predominantly closed cells in a resulting foamed resin sheet product. However, it is difficult to heat the sheet uniformly throughout to obtain uniform foaming, particularly in a continuous manner. Moreover, while the resin is in a heat-softened condition, the sheet will sag and distort under its own weight and must be supported in some way even though it is sticky and expanding in all directions.

In U.S. Pat. No. 3,562,367 to Shinohara et al., there is described a float process of continuously foaming foamable cross-linked polyolefinic resin sheet. In that process, such a sheet is heated in part and supported by floating it on the surface of a heavier liquid heat transfer body, the sheet being concurrently heated from above with heat rays. A suitable such heat transfer liquid is a molten mixture of low melting salts, such as a mixture comprising potassium nitrate and sodium nitrite, which melts at a temperature below the foaming temperature of the foamable sheet and is used at a temperature that softens the sheet and decomposes the blowing agent. In the foaming stage, the sheet is supported upon the flat upper surface of the heat transfer liquid and is free to expand in all directions. However, while heating the foamable sheet to effect uniform foaming thereof, the heat transferred from the liquid to the bottom surface of the sheet must be exactly matched by the heat transferred to the upper surface of the sheet from the irradiating heat source above the sheet, such as infrared lamps or like devices. Attaining such matching is particularly difficult in an operation where the foamable sheet is continuously moved across the surface of a liquid heat transfer bath, foamed, and taken off and away as foamed sheet, wherein the temperature of the sheet changes during such transit and the temperature profiles of the sheet may also change during the operation.

In addition, because the process disclosed in U.S. Pat. No. 3,562,367 employs one heat transfer medium below the foaming sheet and a different medium above the sheet, the problem of temperature matching is further complicated and uniform foaming is harder to achieve. The liquid below the foaming sheet provides better heat transfer than the gas above the sheet, causing the lower surface of the sheet to expand at a faster rate than the upper surface. Thus, curling of the edges of the foaming sheet can occur.

Moreover, sheets of some resins, such as linear polyethylene, which are susceptible to degradation and other deleterious effects of exposure to air at high temperatures, cannot consistently be foamed by the liquid bath surface float method as described in U.S. Pat. No. 3,562,367 without elaborate and inconvenient measures to maintain an appropriately inert atmosphere over the liquid bath.

Accordingly, it would be desirable to provide improved method and means to effect foaming of a heat foamable material especially in the form of sheet comprising thermoplastic resin and foaming agent, such as a thermally-decomposable blowing agent, which method and means would supply the necessary heat uniformly and simultaneously to all sides of the foamable and foaming material while protecting it from exposure to deleterious atmosphere, and would allow the foaming material to expand freely in all directions without distortion while carrying out the operation in a continuous manner.

BRIEF SUMMARY OF THE INVENTION

The present invention is an improvement in a continuous method of producing foamed resin products wherein a heat foamable thermoplastic resin is heated in part and supported by floating upon a body of heat transfer liquid that is at a temperature at or above the foaming temperature of the foamable resin composition. While floating upon the body of heat transfer liquid, the resin is concurrently heated from above, whereby the foamable resin composition is heated to foaming temperature and foamed, and the resulting foamed product is removed from the body of heat transfer liquid, which liquid has greater density than the foaming and foamed resin product. The improvement of the present invention comprises heating the resin from above by flooding the upper surface of the foamable and foaming resin with a blanket of a heat transfer liquid at substantially the same temperature as the body of heat transfer liquid that is used to heat and support the lower surface of the resin. Thus, the foaming product is essentially surrounded by the heat transfer liquid on all sides and is subjected on all sides simultaneously to the uniform heat input of the liquid heat transfer medium.

The resulting foam products of the present invention are superior to those made from comparable materials by the float process as disclosed in U.S. Pat. No. 3,562,367, in which the upper surface of the foamable and foaming resin is heated by such devices as infrared heaters, because the present resulting foam products are more completely foamed and are more consistently uniform, smooth and regular, and free of surface blisters, scorched spots or areas of non-foaming or poor foaming. Also, production rates of foaming can be substantially faster since heating during foaming is entirely by liquid heat transfer means and higher temperatures can be used. Moreover, resin compositions which cannot be foamed by the process in U.S. Pat. No. 3,562,367 because they are susceptible to oxidation and degradation when exposed to air during foaming are successfully foamed by the present invention. Furthermore, the present invention does not require a pre-heating zone to compensate for the effect of non-uniform heating caused by the diverse heating media used in U.S. Pat. No. 3,562,367.

The present process is more stable in continuous operation than the float process disclosed in U.S. Pat. No. 3,562,367. Once adjusted to operating conditions, it is less likely to become upset. It is also more flexible to allow wider selection of optimum operating conditions and can allow a wider variety of starting materials and products.

In preferred embodiments, the starting foamable resin is in the form of sheet, such as a strip or web of indefinite length, which is continuously passed through the foaming step, foamed, and collected as foamed sheet.

Alternatively, the starting sheet is in the form of short-length pieces which individually or in succession are similarly passed through the foaming step, foamed, and collected as foamed sheet pieces. By the term "sheet" as used herein is meant a form having at least one dimension (thickness, for example) that is relatively small; although the other dimensions (width and length, for example) can be relatively large (as in webs of indefinite length), the width or both width and length can also be relatively small, e.g., in long tapes or strands of small width and thickness, or in pieces (in the nature of bits or granules) having small length, width and thickness.

By "foamable" is meant that the starting material is capable of expanding by heat to form a product of larger volume and lower overall density, having cellular structure (usually substantially closed cells) in the resin matrix. Foamable starting materials include initially noncellular materials and also include cellular materials that are capable of further expansion. Foamable starting materials also include composite structures such as laminates wherein the constituent components differ from each other in some respect, e.g., wherein at least one component is foamable and other components may or may not be foamable, such as a laminate sheet with foamable core and non-foamable skin layers, or multilayered foamable structures wherein the layers are foamable or foamed layers of different densities.

Figure 1:
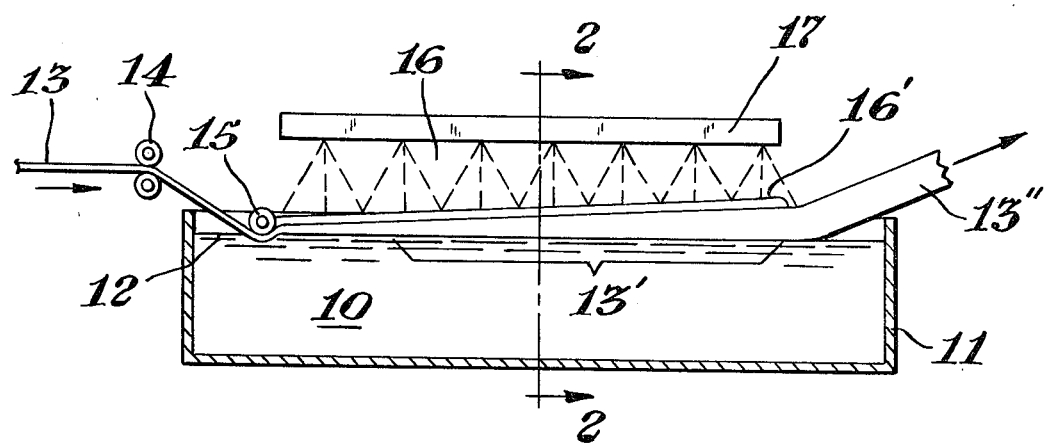
FIG. 1 of the drawings is a schematic sketch of one embodiment of method and apparatus means according to the invention.

The drawing sketches are not necessarily to scale, and conventional mechanical parts and structures of the apparatus are omitted for clarity.

DETAILED DESCRIPTION AND EMBODIMENTS

Heat foamable thermoplastic resins known in the prior art to be suitable for making foamed products in or on the surface of bodies of liquid heat transfer media are appropriate for use in the present invention. Suitable polyolefin resin starting materials, and chemical foaming agent starting materials, and means of fabricating therefrom foamable compositions and sheet forms thereof are disclosed in detail in U.S. Pat. No. 3,562,367 to Shinohara et al., which is hereby incorporated by reference in the present description. Other already known suitable foamable resins include styrenic polymer resins, e.g., copoly(styrene-acrylonitrile), polycarbonates, or other thermoplastic resins, and contain physical (as contrasted to chemically decomposable) foaming agents such as normally liquid agents that vaporize to form gas cells in the resin matrix at foaming temperature, for example, fluorocarbons, chlorofluorocarbons and the like.

The essence of improvement in the present invention as applied to the foaming of such foamable resins comprises an improved means to heat the upper surface of the foamable and foaming resin while it is heated in part and suspended by floating upon the surface of a body of heat transfer liquid. Suitable liquid heat transfer media include heat stable glycols, glycol ethers, polyether glycols, other polyols, silicone oils, fluorinated hydrocarbon oils, molten low-melting salts and mixtures of salts, and molten low-melting metals and metal alloys.

The upper surface of the foamable and foaming resin is heated by flooding with a blanket of a heat transfer liquid at a temperature substantially the same as that of the body of heat transfer liquid upon which the resin composition is floating. The flooding liquid may be the same as the supporting liquid or, alternatively, it may be of a different composition, such as an immiscible, lower-density liquid. Advantageously, both the flooding and the supporting liquids are of the same composition. Preferably, the flooding liquid is drawn directly from the body of the supporting heat transfer liquid and spread over the top of the floating resin material, from which it flows back into the main body of liquid. Means are provided for pumping the flooding heat transfer liquid and dispersing it uniformly over the upper surface of the foaming and foamable resin in such fashion that the expanding resin is essentially surrounded by heat transfer liquid at a substantially uniform temperature. In one mode, the flooding liquid is dispensed over the upper surface of the foamable and foaming resin by pumping the heat transfer liquid through a plurality of outlets above the expanding resin. Optionally, the flooding liquid is dispensed over the upper surface of the resin in an angular fashion so as to direct the floating resin towards the center of the supporting body of liquid, thus preventing lateral movement of the resin during the foaming process. It is particularly advantageous to ensure uniform and substantially complete coverage of the surface of the foamable and foaming resin with the flooding liquid so that the resin is heated uniformly throughout during expansion. When foaming a resin susceptible to degradation, such as linear polyethylene, it is essential that the resin be completely blanketed with the heat transfer liquid so as to prevent exposure to oxygen during the foaming stage.

Suitable heating means are provided to heat the flooding liquid and the supporting liquid to substantially uniform operating temperature. In one mode, e.g., when the flooding liquid is drawn from the body of supporting liquid, heating means are located within the body of supporting liquid. Optionally, heating means are located both within the body of supporting liquid and within the body of flooding liquid so as to provide greater flexibility and control of operating conditions. Other combinations and variations are possible.

Because there is greater surface area per unit volume at the edges of the foamable resin material, those edges will initially foam and expand at a faster rate than the rest of the resin composition. Thus, a natural depression is created in the surface of the foaming resin material which is capable of containing a layer of heat transfer liquid therein. If the resin material is in sheet form, this depression can be likened to a trough which inherently maintains a layer of heat transfer liquid over the foaming resin until foaming is completed and the sheet assumes a uniform thickness. To hasten this edge-foaming phenomenon within the process of this invention, a roller or suitable means can optionally be provided at the inlet area to direct the unfoamed resin material at least partially into the body of supporting heat transfer liquid. Such a roller may also prevent the flooding heat transfer liquid from flowing back and off of the foaming resin sheet.

Figure 2:
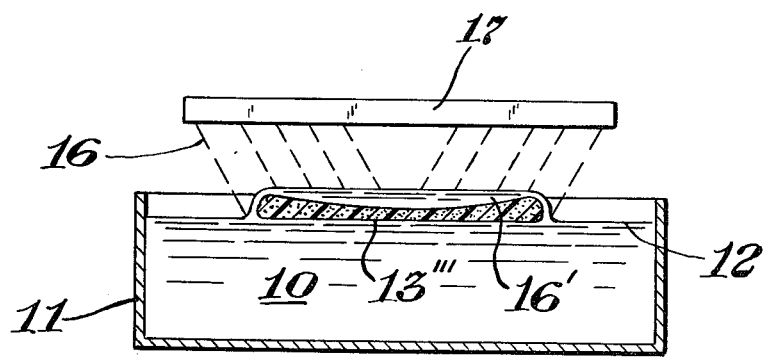
FIG. 2 is an end-view sectional sketch of the apparatus depicted in FIG. 1.

The invention can be visualized by reference to the drawings. FIGS. 1 and 2 schematically illustrate one embodiment of suitable method and apparatus, FIG. 1 being a longitudinal vertical section of the foamer in elevation and FIG. 2 being an end-view section in elevation. A supporting body of heat transfer liquid 10 is maintained in a suitable vessel 11, heated and circulated within the vessel by conventional means not shown, the body of liquid having an upper surface 12.

A web 13 of foamable resin composition is taken from a source not shown through a constant speed control device such as rollers 14 and passes beneath a roller 15 which partially or completely depresses the web into the liquid bath. Suitable flooding means 17 dispense the flooding liquid 16 over the upper surface of the web, forming a layer of flooding liquid 16' which blankets the foamable and foaming web. The flooding liquid flows off the surface of the web and into the main body of supporting liquid. When the flooding liquid and the supporting liquid are of the same composition, for example, the flooding liquid is drawn from the main body of supporting liquid and pumped to the flooding means 17 by means not shown. The roller 15 prevents the layer of flooding heat transfer liquid from flowing back off the inlet portion of the web. Being substantially surrounded by heat transfer liquid, the web floats across the surface of the supporting liquid where it foams to form foamed product 13" which is withdrawn from the liquid bath, cooled, cleaned, and collected by means not shown.

In the initial portion of the path across the surface of supporting liquid, the resin web is being heated by the liquid above and below the web toward a temperature where the resin softens and the foaming agent is activated to form and/or expand gas cells therein. As the web reaches that temperature and foams, it expands in all directions — in thickness, width, and length — as shown in region 13'. If the expansion is isotropic, each dimension increases by a factor which is the cube root of the volume expansion. At the earlier stages of foaming, because of the greater surface area per unit volume at the edges, the edges of the web foam and expand at a faster rate than the rest of the web. As represented in FIG. 2, the expanding edges inherently form a trough on the upper surface of the web, as depicted by 13''', which maintains a layer of flooding liquid 16' over the sheet until foaming is complete and the web assumes a uniform thickness.

Because the volume of the web is increasing during the foaming stages, the upward thrust of the web by bouyancy forces is also increasing. Its natural tendency is to float toward the surface of the liquid medium, and the flow of flooding liquid 16 must be maintained at a sufficient rate to keep the expanding web substantially blanketed by the flooding liquid so that the web receives uniform heat input on all sides during foaming and, when the presence of oxygen would be deleterious, so that oxygen is excluded from the surface of the web. In one embodiment, the flooding liquid is pumped by means not shown from the body of the supporting liquid and into suitable flooding means 17 fixed above the surface of the foamable and foaming web. The flooding means, for example, can be comprised of a plurality of nozzles which spray the flooding liquid over the surface of the web. Surprisingly, it was found that such spraying will not tear or distort the web even though it is in a softened and weak condition from heating to foaming temperature. It was also discovered that the spray could be adjusted in an angular fashion as shown in FIG. 2 so as to maintain the web in the center of the liquid bath and prevent wandering in a lateral direction as the web passes through the foaming apparatus.

Although the apparatus as shown in FIG. 1 is sufficient to complete the foaming process, a preheating zone can be incorporated at the web feed end of the operation. Before entering the heat transfer liquid bath, the web may be partially preheated by conventional means not shown, e.g., by passing through a heated oven or between radiant heaters or the like. Throughout the preheating zone, it is essential that the temperature of the web not rise to the foaming temperature of the resin composition. Advantageously, foaming should not occur until the web has passed the submerging and retaining roller 15.

The following specific examples illustrate the invention but are not to be taken as limiting its scope. Parts and percentages are by weight unless otherwise indicated or required by context.

EXAMPLE 1

A chlorinated polyethylene (CPE) composition, based on linear polyethylene having standard Melt Index 6 dg/min and containing 36 percent chlorine, was formulated as follows:

| | |
|---|---|
| CPE: | 100 parts |
| Calcium stearate (1) | 2 parts |
| Azodicarbonamide (2) | 10 parts |
| Epoxidized soybean oil (3) | 3 parts |

Notes:
(1) a thermal stabilizer
(2) a chemical foaming agent
(3) a thermal stabilizer (trade name Drapex® 6.8)

The CPE formulation was heat-plastified and extruded (without decomposing the azodicarbonamide) into a ribbon-like non-cellular web 3 inches wide and 0.11 inch thick. The web was irradiated at room temperature with 5.5 megarads of $\beta$-radiation from a Van de Graaff generator to effect partial cross-linking of the CPE resin.

A flood foaming apparatus having the essential characteristics according to FIG. 1 was constructed and used to foam the CPE web. The flooding liquid was pumped from the body of supporting heat transfer liquid and dispersed over the upper surface of the foamable and foaming resin strip so as to substantially surround it with heated liquid as it passed through the foaming apparatus. The heat transfer liquid was composed of a molten salt mixture of about equal parts potassium nitrate and sodium nitrite, maintained at a temperature of approximately 220° C.

Surrounded by the heat transfer liquid, the foamable CPE resin material foamed in about 100 seconds. The so-formed foamed sheet was washed with water, cooled, and dried. The resulting foamed sheet product had a fine closed-cell structure with a density of approximately 3.5 pounds per cubic foot (pcf). The sheet was uniform through its cross-section; its surfaces were alike and were smooth, flat, and they had good texture and white color.

In comparison, a foamable resin composition of the same type was foamed according to the process described in U.S. Pat. No. 3,562,367 to Shinohara et al., by floating it upon the surface of the heat transfer liquid while concurrently heating the upper surface of the foamable and foaming sheet with infrared heaters. The product prepared according to that process was curled at the edges and the uppermost surface was oxidized and dark in color. A uniformly foamed sheet of good quality was not obtained.

EXAMPLE 2

In a manner and in a foamer like those described in Example 1, a web of ethylene and vinyl acetate copolymer (EVA) composition was foamed in a continuous flooding process. The EVA composition, having 28 percent vinyl acetate and standard melt flow rate of about 3 dg/min, was prepared by admixing 100 parts of the copolymer and 13 parts of azodicarbonamide foaming agent. The mixture was heat-plastified at minimum temperature to soften the resin without decomposing the azodicarbonamide and extruded into a strip 3 inches wide and 0.11 inch thick. The non-cellular strip was then irradiated with 3 megarads b-radiation from a Van de Graaff generator to effect partial cross-linking of the polymer structure of the EVA resin.

The EVA web was passed across and flooded with the molten salt mixture maintained at 245° C., where the sheet foamed in a residence time of about 90 seconds. The resulting foamed sheet was continuously taken from the bath, washed, cooled, and dried. The product, having a density of about 2 pcf, was fine-celled and of excellent uniformity and quality, and the surfaces were smooth, flat, and of good white color.

By way of contrast, the higher foaming temperatures used in the process of the present invention will not produce good quality foam when used in the process described in U.S. Pat. No. 3,562,367 because of the problems with oxidation and poor control of heat transfer through air, as compared to the uniform heat transfer attainable in a liquid medium. By using a higher foaming temperature in accordance with the present invention, foaming rates are faster, the blowing agent is more efficient, and a whiter product is obtained.

EXAMPLE 3

A linear polyethylene composition, having standard Melt Index 5 dg/min and density 0.965 g/cc, was formulated and foamed in a manner and in a foamer like those described in Example 1. The composition was prepared by admixing 100 parts of the polymer, 2 parts of azodicarbonamide foaming agent, and 0.75 parts of 2,5-dimethyl-2,5-bis(t-butylperoxy)hexyne-3 cross-linking agent (trade name Lupersol ® 130). The mixture was heat-plastified without decomposing the azodicarbonamide and extruded and rolled into a strip 4 inches wide and 0.19 inch thick.

The linear polyethylene strip was passed across and flooded with the molten salt maintained at 245° C., where the sheet foamed in a residence time of about 150 seconds. The resulting foamed sheet was continuously taken from the bath, washed, cooled, and dried. The resulting foam product, having a density of 11 pcf and measuring about 6 inches wide and 0.2 inch thick, was of excellent uniformity and quality. Its surfaces were smooth, flat, and free of scorched spots and blisters.

As demonstrated by this example, the foaming method of the present invention is suitable for foaming resin compositions having relatively low melt strength, such as linear polyethylene containing a peroxide cross-linking agent. A peroxide compound does not effect cross-linking of the resin structure until the resin is heated to a certain temperature. Consequently, during the initial stages of the foaming process, i.e., before the peroxide compound effects cross-linking of the resin structure, the heated resin is in a very weak and softened condition. Surprisingly, a resin in that condition is not torn or distorted by the force of the flooding liquid, and the resin can be effectively foamed to a high quality product.

What is claimed is:

1. In a continuous method of producing foamed resin products wherein a heat foamable thermoplastic resin is heated in part and supported by floating upon a body of heat transfer liquid that is at a temperature at or above the foaming temperature of the foamable thermoplastic resin, the resin being concurrently heated from above, whereby the foamable resin is heated to foaming temperature and foamed, and the resulting foamed resin product is removed from the body of heat transfer liquid, which liquid has greater density than the foaming and foamed resin product, the improvement which comprises heating the upper surface of the foamable and foaming resin by flooding said upper surface with a blanket of a heat transfer liquid at substantially the same temperature as the supporting body of heat transfer liquid.

2. The improvement according to claim 1 wherein the flooding liquid and the supporting liquid are of the same composition.

3. The improvement according to claim 2 wherein the flooding liquid is drawn from the supporting body of heat transfer liquid.

4. The improvement according to claim 1 wherein the starting foamable thermoplastic resin is a partially cross-linked olefin polymer resin composition with a foaming agent.

5. The improvement according to claim 1 wherein the starting foamable thermoplastic resin is a chlorinated polymer of ethylene, partially cross-linked by high energy radiation, containing a foaming agent.

6. The improvement according to claim 1 wherein the starting foamable thermoplastic resin is a copolymer of ethylene and vinyl acetate, partially cross-linked by high energy radiation, containing a foaming agent.

7. The improvement according to claim 1 wherein the starting foamable thermoplastic resin is a polymer of ethylene, containing a foaming agent and a peroxide cross-linking agent.

8. The improvement according to claim 1 wherein the heat transfer liquid is a molten mixture of potassium nitrate and sodium nitrite.

9. The improvement according to claim 1 wherein the starting foamable thermoplastic resin is in the form of a sheet.

* * * * *